(12) United States Patent
Miyamoto et al.

(10) Patent No.: US 11,223,057 B2
(45) Date of Patent: Jan. 11, 2022

(54) FUEL CELL SYSTEM

(71) Applicant: TOYOTA JIDOSHA KABUSHIKI KAISHA, Toyota (JP)

(72) Inventors: Yusuke Miyamoto, Nisshin (JP); Shigeki Hasegawa, Toyota (JP); Naoki Tomi, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 108 days.

(21) Appl. No.: 16/735,793

(22) Filed: Jan. 7, 2020

(65) Prior Publication Data
US 2020/0280083 A1 Sep. 3, 2020

(30) Foreign Application Priority Data
Mar. 1, 2019 (JP) .............................. JP2019-037407

(51) Int. Cl.
| | | |
|---|---|---|
| *H01M 8/04* | (2016.01) | |
| *H01M 8/04746* | (2016.01) | |
| *H01M 8/0438* | (2016.01) | |
| *H01M 8/04111* | (2016.01) | |
| *H01M 8/04082* | (2016.01) | |

(52) U.S. Cl.
CPC .... *H01M 8/04776* (2013.01); *H01M 8/04111* (2013.01); *H01M 8/04201* (2013.01); *H01M 8/04395* (2013.01); *H01M 8/04753* (2013.01)

(58) Field of Classification Search
CPC ......... H01M 8/04776; H01M 8/04111; H01M 8/04201; H01M 8/04395; H01M 8/04753
See application file for complete search history.

(56) References Cited

U.S. PATENT DOCUMENTS

| | | | | |
|---|---|---|---|---|
| 10,930,953 | B2 * | 2/2021 | Iio | H01M 8/04753 |
| 2014/0120446 | A1 * | 5/2014 | Zhang | H01M 8/04761 |
| | | | | 429/444 |
| 2016/0126566 | A1 | 5/2016 | Iio | |
| 2017/0250423 | A1 * | 8/2017 | Koiwa | H01M 8/04141 |
| 2017/0352899 | A1 * | 12/2017 | Asai | H01M 8/04753 |
| 2018/0269501 | A1 * | 9/2018 | Kashiwagi | H01M 8/04089 |
| 2019/0173113 | A1 * | 6/2019 | Ono | H01M 8/04029 |
| 2019/0181475 | A1 * | 6/2019 | Farnsworth | H01M 8/04753 |
| 2019/0260047 | A1 | 8/2019 | Miyamoto et al. | |
| 2020/0388863 | A1 * | 12/2020 | Yoshitomi | H01M 8/04201 |

FOREIGN PATENT DOCUMENTS

| | | | |
|---|---|---|---|
| JP | 2009123550 A | 6/2009 | |
| JP | 2016091833 A | 5/2016 | |
| JP | 2017143020 A | 8/2017 | |
| JP | 2018181771 A | 11/2018 | |

\* cited by examiner

*Primary Examiner* — Amanda C. Walke
(74) *Attorney, Agent, or Firm* — Dickinson Wright, PLLC

(57) ABSTRACT

The present disclosure provides a fuel cell system that achieves a stable operation of a turbo compressor.
The fuel cell system includes: a fuel cell; an air supply flow path; a turbo compressor; a bypass flow path configured to discharges air by branching off from the air supply flow path; a pressure regulating valve; a bypass valve; and a control unit, the pressure regulating valve, and the bypass valve, in which the control unit calculates, from a flow rate of air supplied based on an actual rotation speed of the turbo compressor and a target flow rate of air to the fuel cell, a flow rate of excess air discharged from the bypass flow path, and determines a degree of opening of the bypass valve based on the target flow rate of air and the flow rate of excess air.

1 Claim, 8 Drawing Sheets

FUEL CELL SYSTEM

CROSS REFERENCE TO RELATED APPLICATIONS

This application is based upon and claims the benefit of priority from Japanese patent application No. 2019-37407, filed on Mar. 1, 2019, the disclosure of which is incorporated herein in its entirety by reference.

BACKGROUND

The present disclosure relates to a fuel cell system.

A fuel cell system including a fuel cell that generates electric power by a fuel gas and an oxidant gas being supplied thereto is known. An air compressor that supplies air, which is an oxidant gas, to the fuel cell is provided in the fuel cell system. As an air compressor, a turbo compressor configured so that a rotating body such as a rotary impeller is rotated inside the frame to compress air is known.

In the turbo compressor, surging occurs and the operation thereof becomes unstable in some cases when the flow rate of air supplied to the fuel cell is low. Surging refers to a phenomenon in which the flow rate of air and air pressure are greatly, periodically changed. If surging occurs, the flow rate of supplied air cannot be adjusted in some cases.

The following prior art documents disclose a fuel cell system including: a fuel cell; an air supply flow path for supplying air to the fuel cell; a turbo compressor that supplies air through the air supply path; a bypass flow path that discharges air by branching off from the air supply flow path so as to bypass the fuel cell; a bypass valve that adjusts the amount of air passing through the bypass flow path; and a control apparatus that controls the rotation speed of the turbo compressor and the bypass valve. In the following prior art documents, it has been studied how to achieve a stable operation of the turbo compressor in the fuel system.

Japanese Unexamined Patent Application Publication No. 2009-123550 discloses that in the aforementioned fuel cell system, when the flow rate of air required for the fuel cell is less than the predetermined lower limit of the flow rate of the turbo compressor, the flow rate of air supplied to the fuel cell is adjusted while the flow rate of air supplied by the aforementioned turbo type air compressor is maintained at the lower limit of the flow rate or more by using the flow rate of air passing through the bypass flow path.

Japanese Unexamined Patent Application Publication No. 2018-181771 discloses that in the aforementioned fuel cell system, when the control apparatus estimates that an operating point of the turbo compressor, which is determined by the flow rate of air and air pressure required for the fuel cell, enters a surge region described later, the rotation speed of the turbo compressor is gradually reduced and the degree of opening of the bypass valve is controlled so as to discharge excess air through the bypass flow path, so that the operating point does not enter the surge region.

Japanese Unexamined Patent Application Publication No. 2017-143020 discloses that in the aforementioned fuel cell system, it is determined whether or not the current operating point of the turbo compressor is in an operation region near the surge, and when it is determined that the operating point is in the operation region near the surge, the bypass valve is opened to reduce the pressure in the air supply flow path, and then the rotation speed of the turbo compressor is reduced.

Further, Japanese Unexamined Patent Application Publication No. 2016-91833 discloses that in the aforementioned fuel cell system, a discriminator that discriminates whether or not a dry-up has occurred in a fuel cell stack, and a controller that performs, when it is determined that a dry-up has occurred in the fuel cell stack, recovery control for eliminating the dry-up are further provided. Further, it also discloses that in the recovery control, the air pressure is increased by increasing the flow rate of air in a specific range based on the flow rate of air required for the fuel cell stack, in order to prevent surging of the turbo compressor.

SUMMARY

The flow rate of air required by the fuel cell depends on the electric energy required for a device to which the fuel cell supplies electric power. Accordingly, the flow rate of air required by the fuel cell may be greatly changed depending on the operating status of the device.

When the flow rate of air required by the fuel cell is reduced, the target rotation speed of the turbo compressor is reduced. When the flow rate of the required air is sharply reduced, the actual rotation speed of the turbo compressor may not be able to conform to the change in the target rotation speed due to inertia or the like. When a response delay due to a reduction in the rotation speed occurs in the turbo compressor, a pressure deviation occurs therein. At this time, the flow rate of air supplied by the turbo compressor moves to the flow rate side lower than the target value due to the pressure deviation. As a result, the operating point of the turbo compressor enters the surge region, whereby surging may occur.

The present disclosure has been made to solve the above-described problem and provides a fuel cell system that achieves a stable operation of a turbo compressor even if the flow rate of air supplied to a fuel cell is greatly changed.

A first exemplary aspect is a fuel cell system including:
a fuel cell;
an air supply flow path configured to supply air to the fuel cell;
a turbo compressor configured to supply air to the fuel cell through the air supply flow path;
a bypass flow path configured to discharge air by branching off from the air supply flow path so as to bypass the fuel cell;
a pressure regulating valve configured to adjust a flow rate of air passing through the air supply flow path;
a bypass valve configured to adjust a flow rate of air passing through the bypass flow path; and
a control unit configured to control the turbo compressor, the pressure regulating valve, and the bypass valve, in which
the control unit:
  calculates, from a flow rate $Q_2^*$ of air supplied based on an actual rotation speed of the turbo compressor and a target flow rate $Q_{FC}^*$ of air to the fuel cell, a flow rate $Q_{BP}^*$ of excess air discharged from the bypass flow path, and
  determines degrees of opening of the pressure regulating valve and the bypass valve based on the target flow rate $Q_{FC}^*$ of air and the flow rate $Q_{BP}^*$ of excess air.

The fuel cell system according to the first exemplary aspect calculates, from the flow rate of air supplied based on the actual rotation speed of a turbo compressor, the flow rate of excess air discharged through the bypass flow path while taking into consideration that a response delay occurs in the turbo compressor. As a result, surging of the turbo compressor is prevented, thereby achieving a stable operation of the turbo compressor.

Further, a second exemplary aspect is a fuel cell system including:
a fuel cell;
an air supply flow path configured to supply air to the fuel cell;
a turbo compressor configured to supply air to the fuel cell through the air supply flow path;
a bypass flow path configured to discharge air by branching off from the air supply flow path so as to bypass the fuel cell;
a pressure regulating valve configured to adjust a flow rate of air passing through the air supply flow path;
a bypass valve configured to adjust a flow rate of air passing through the bypass flow path; and
a control unit configured to control the turbo compressor, the pressure regulating valve, and the bypass valve, in which
the control unit:
calculates, from a flow rate $Q_2^*$ of air supplied based on an actual rotation speed of the turbo compressor and a target flow rate $Q_{FC}^*$ of air to the fuel cell, a flow rate $Q_{BP}^*$ of excess air discharged from the bypass flow path when a current pressure ratio of the turbo compressor is equal to or higher than a predetermined value with respect to a target pressure ratio;
calculates, from a target supply flow rate $Q_1^*$ of the turbo compressor and a target flow rate $Q_{FC}^*$ of air to the fuel cell, a flow rate $Q_{BP}^*$ of excess air discharged from the bypass flow path when a current pressure ratio of the turbo compressor is less than a predetermined value with respect to a target pressure ratio; and
determines degrees of opening of the pressure regulating valve and the bypass valve based on the target flow rate $Q_{FC}^*$ of air and the flow rate $Q_{BP}^*$ of excess air.

The fuel cell system according to the second exemplary aspect calculates, from the flow rate of air supplied based on the actual rotation speed of a turbo compressor, the flow rate of excess air discharged from the bypass flow path while taking into consideration that a response delay is likely to occur in the turbo compressor when the current pressure ratio of the turbo compressor is equal to or higher than a predetermined value with respect to the target pressure ratio, whereby the operating point of the turbo compressor is likely to enter the surge region. On the other hand, the operating point of the turbo compressor is not likely to enter the surge region when the current pressure ratio of the turbo compressor is less than a predetermined value with respect to the target pressure ratio, and accordingly the fuel cell system according to the second exemplary aspect calculates, from the target supply flow rate of the turbo compressor, the flow rate of excess air discharged from the bypass flow path. By this method, a calculated value of the flow rate of excess air becomes small when the flow rate of air required for the fuel cell is gradually changed, or when the current pressure ratio of the turbo compressor approaches the target pressure ratio. As a result, the amount of excess air passing through the bypass can be reduced, thereby reducing the rotation speed of the turbo compressor.

According to the present disclosure, it is possible to provide a fuel cell system that achieves a stable operation of a turbo compressor even if the flow rate of air supplied to a fuel cell is greatly changed.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Embodiments of the present disclosure will be described hereinafter with reference to the drawings. However, the present disclosure is not limited to the following embodiments. For the clarification of the explanation, the following description and the drawings are simplified as appropriate.

A fuel cell system according to embodiments is described. The fuel cell system according to this embodiment is a fuel cell system mounted on, for example, a fuel cell vehicle (FCV). Note that the fuel cell system is not limited to being used for a vehicle such as a fuel cell vehicle and a hybrid automobile, and instead it may also be used for various mobile bodies such as a two-wheeled vehicle.

First Embodiment

Figure 1:
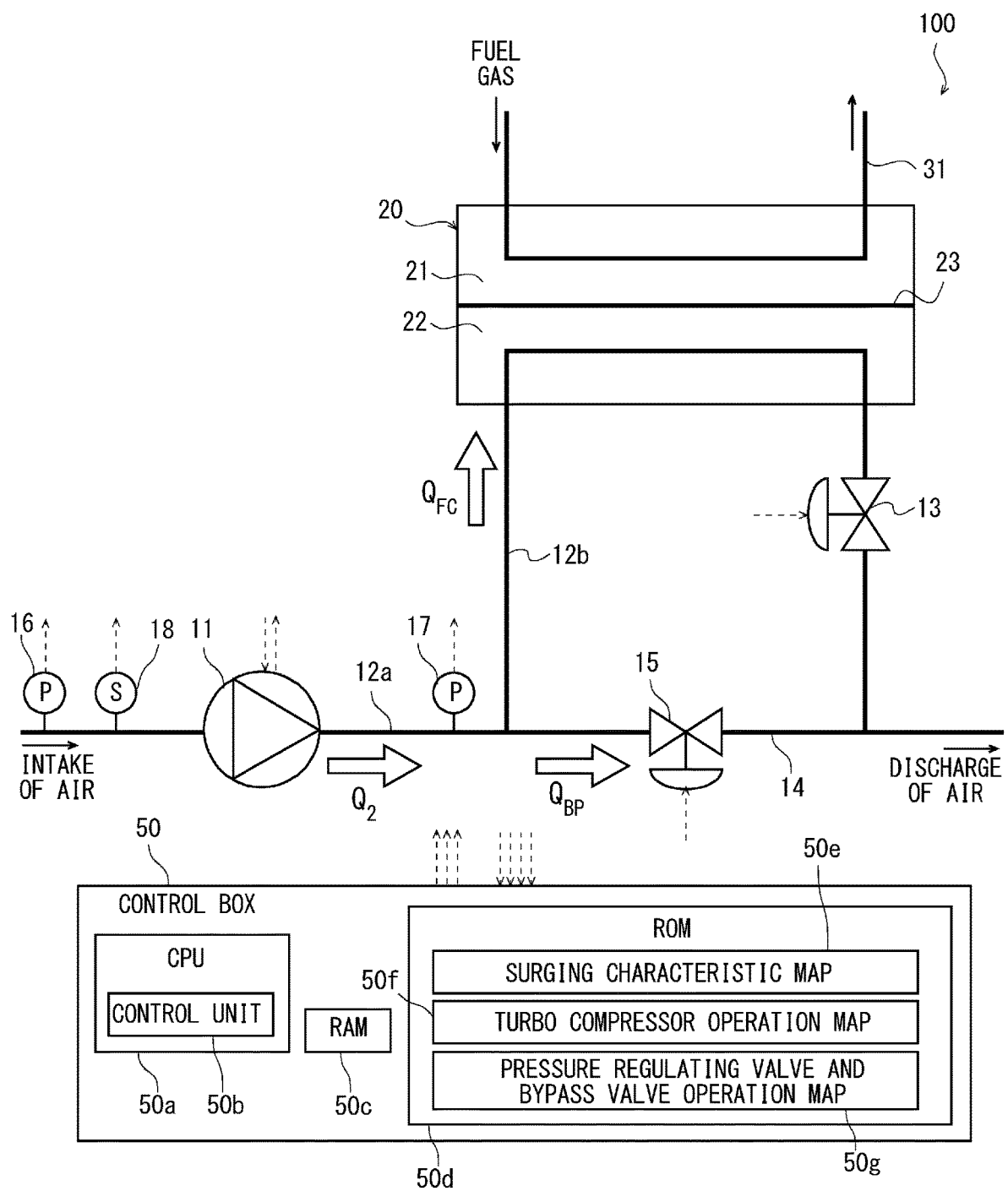
FIG. 1 is an explanatory diagram showing a schematic configuration of a fuel cell system according to an embodiment.

FIG. 1 is an explanatory diagram showing a schematic configuration of a fuel cell system according to this embodiment. As shown in FIG. 1, a fuel cell system 100 includes a fuel cell 20, a turbo compressor 11, air supply flow paths 12a and 12b, a pressure regulating valve 13, a bypass flow path 14, a bypass valve 15, two pressure gauges 16 and 17, a flowmeter 18, and a control box 50. Note that the air supply flow path 12a indicates a part of the air supply flow path which is not branched off from the bypass flow path 14, and the air supply flow path 12b indicates a part of the air supply flow path which is branched off from the bypass flow path 14.

The fuel cell 20 is an example of a polymer electrolyte fuel cell, and an anode 21 and a cathode 22 are each located on a respective surface of an electrolyte membrane 23. Although the fuel cell 20 is shown as a single cell in FIG. 1, a plurality of single cells may be stacked to form a fuel cell stack. Hydrogen gas that is a fuel gas is supplied to the anode 21 through a fuel gas flow path 31 from a hydrogen gas tank (not shown).

Meanwhile, air that is an oxidant gas is supplied to the cathode 22 through the air supply flow path 12. The supplied fuel gas and oxidant gas are used for an electrochemical reaction, and the remaining gas of each of the above gases that have not reacted is discharged to the outside of the fuel cell 20 as an off gas. Note that for the fuel cell 20, a known fuel cell such as a phosphoric acid-based fuel cell may be employed instead of a polymer electrolyte fuel cell.

The turbo compressor 11 sucks air from the outside air, compresses it, and then supplies the compressed air to the cathode 22 of the fuel cell 20 through the air supply flow path 12b. The outside air may be supplied to the turbo compressor 11 after impurities therein are removed by an air cleaner (not shown). In this embodiment, the turbo compressor 11 is used as an air compressor. The turbo compressor includes a rotary body rotated within a housing, and compresses air by the rotation of the rotary body. As the turbo compressor 11, for example, a centrifugal compressor that performs compression by an impeller being rotated and an axial-flow compressor that performs compression by a moving blade (rotor) being rotated can be used. It should be noted that the rotary body is driven by an electric motor (not shown). Accordingly, the rotation speed of the rotary body of the turbo compressor can be controlled by controlling the electric motor.

The flowmeter 18 is located in the air supply flow path 12a, and can measure a total flow rate $Q_2$ of air supplied by the turbo compressor 11. The pressure gauge 16 can measure an outside air pressure (an atmospheric pressure) $P_0$. The outside air pressure corresponds to the suction pressure of the turbo compressor 11. Further, the pressure gauge 17 can measure an air pressure (a discharge pressure) $P_1$ of the air compressed by the turbo compressor 11. In this embodiment, the pressure ratio can be represented by a ratio $(P_1/P_0)$ between the suction pressure and the discharge pressure. Note that as will be described later, the pressure gauge 16 may be omitted in an environment where it can be considered that the atmospheric pressure $P_0$ is stable.

The pressure regulating valve 13 is located in the air supply flow path 12b, and can adjust the flow rate of air supplied to the fuel cell 20. The bypass valve 15 is located in the bypass flow path 14, and can adjust the flow rate of air passing therethrough. The bypass flow path 14 is provided so that one end thereof is branched from the air supply flow path 12a and the other end thereof serves as an exhaust port. The bypass flow path 14 forms a flow path of air that bypasses the fuel cell 20.

The control box 50 includes a CPU 50a, a RAM 50c, and a ROM 50d. The CPU 50a functions as the control unit 50b by executing a control program (not shown) stored in the ROM 50d. In the ROM 50d, a surging characteristic map 50e, a turbo compressor operation map 50f, and a pressure regulating valve and bypass valve operation map 50g are stored in advance. Note that these operation maps 50e, 50f, and 50g will be described later. The control box 50 is connected to the pressure gauges 16 and 17, the flowmeter 18, and the turbo compressor 11 so that it can acquire measurement values of the pressure gauges 16 and 17 and the flowmeter 18, and measurement value of the actual rotation speed of the turbo compressor 11. Further, the control box 50 is connected to the pressure regulating valve 13, the bypass valve 15, and the turbo compressor 11 so that it can control the degrees of opening of the pressure regulation valve 13 and the bypass valve 15, and the rotation speed of the turbo compressor 11. The control box 50 may be connected to the pressure regulating valve 13, the bypass valve 15, and the turbo compressor 11 wirelessly or through a wire.

Figure 7:
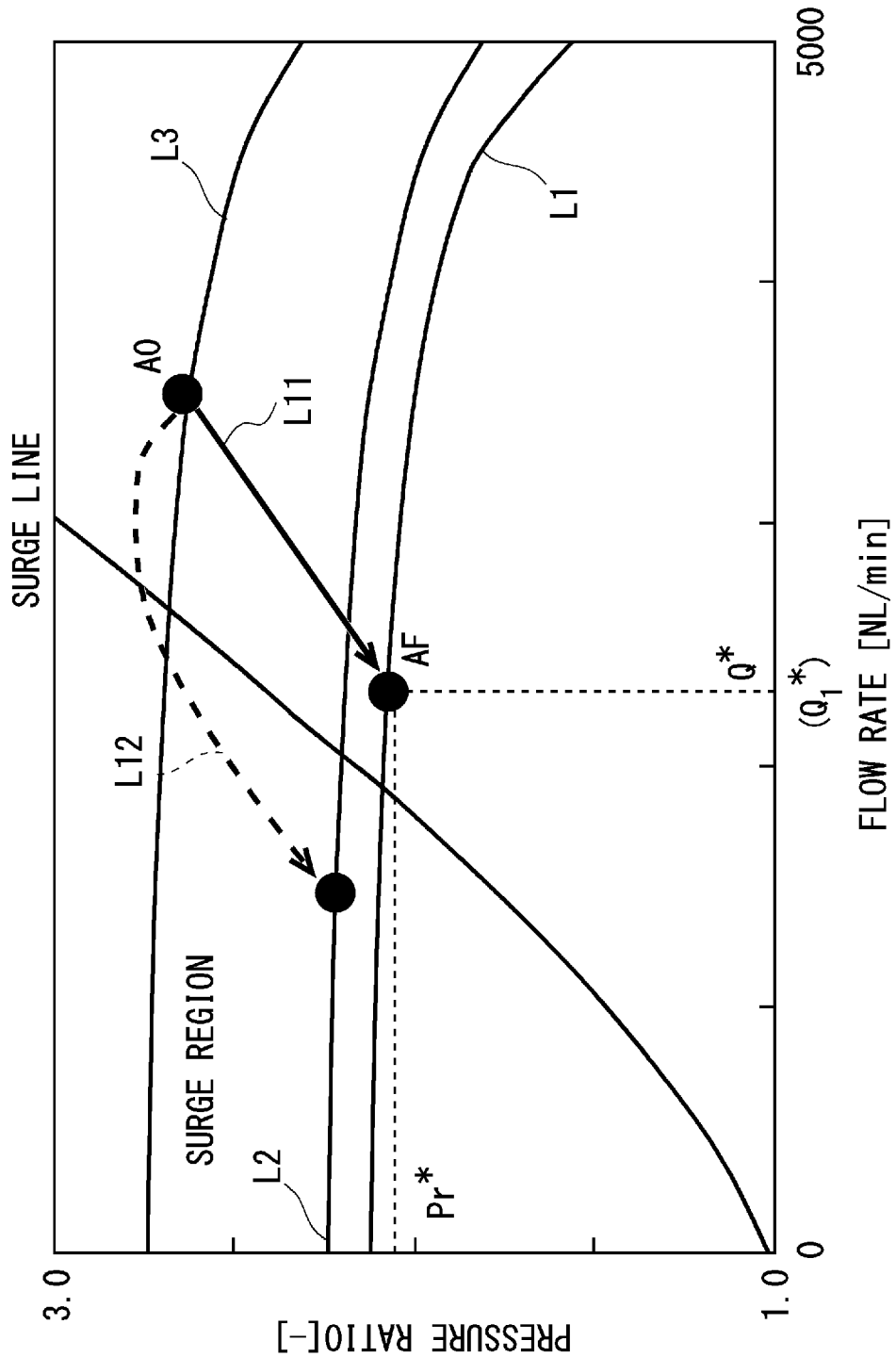
FIG. 7 is an explanatory diagram showing an example of a change in the operating point of the turbo compressor in the related art.

The operation maps are described with reference to FIG. 7. FIG. 7 is an explanatory diagram showing an example of a change in the operating point of the turbo compressor in the related art. In FIG. 7, the horizontal axis indicates the flow rate of air sent from the turbo compressor 11, and the vertical axis indicates the pressure ratio $(P_1/P_0)$ of the turbo compressor 11.

A surge line shown in FIG. 7 indicates a limit condition where surging does not occur. In FIG. 7, the upper left side above the surge line is a region where surging occurs (hereinafter referred to as a surge region), while the right side including the surge line is a region where no surging occurs.

In the turbo compressor 11, if comparisons are made with the same air pressure, surging tends to occur when the flow rate is relatively low, and if comparisons are made with the same flow rate, surging tends to occur when the air pressure is relatively high. As the surge line may differ depending on the components of the turbo compressor 11 or the like, it is determined experimentally in advance. Specifically, for example, in the fuel cell system 100 shown in FIG. 1, the output (the flow rate of air) of the turbo compressor is reduced in a stepwise manner to find the maximum flow rate (the lower limit of the flow rate) at which no surging occurs. Then, this operation is performed a plurality of times while the pressure ratio of the turbo compressor 11 is changed, so that a surge line can be determined. In the fuel cell system 100 according to this embodiment, the surge line obtained in this way is stored in the ROM 50d as the surging characteristic map 50e.

Further, the details of the problem solved by the fuel cell system according to the first embodiment are described with reference to FIG. 7.

An operating state of the turbo compressor 11 can be expressed by a flow rate and a pressure ratio, which is used as an operating point. In FIG. 7, the current operating point is A0. L1, L2, and L3 shown in FIG. 7 are lines, each of which indicates an equal rotation speed of the turbo compressor 11. The rotation speeds of the equal rotation speed lines L1, L2, and L3 become higher in this order. When the rotation speed of the rotary body of the turbo compressor 11 is kept constant and the pressure ratio is changed, the operating point of the turbo compressor 11 moves on the operating line corresponding to the rotation speed. For example, when the pressure ratio of the current operating point is reduced from A0, the operating point of the turbo compressor 11 moves from the upper left to the lower right along the equal rotation speed line L3. Note that as the inclinations of the equal rotation speed lines L1, L2, and L3 are small as shown in FIG. 7, a slight change in the pressure ratio results in a significant change in the flow rate.

As the operating line may differ depending on the components of the turbo compressor 11 or the like, it is experimentally determined in advance. In the fuel cell system 100 according to this embodiment, each of the equal rotation speed lines is stored in the ROM 50d as the turbo compressor operation map 50f.

As described above, the flow rate of air required by the fuel cell is changed depending on the electric energy required for a device to which the fuel cell supplies electric power. In FIG. 7, assume an example in which the target pressure ratio is changed to Pr* and the target flow rate is changed to Q* from the current operating point A0 of the turbo compressor. In this example, the control unit determines the degrees of opening of the pressure regulating valve and the bypass valve and the rotation speed of the turbo compressor from the target pressure ratio and the target flow rate based on the pressure regulating valve and bypass valve operation map 50g. In FIG. 7, the target operating point of the turbo compressor is AF, and it is necessary to reduce the rotation speed of the turbo compressor. L11 shown in FIG. 7 is a line which assumes that the rotation speed of the turbo compressor follows the command of the control unit. When the rotation speed of the turbo compressor conforms to L11, the operating point does not enter the surge region. However, when the rotation speed of the turbo compressor cannot follow the command of the control unit, the rotation speed of the turbo compressor becomes higher than the command. At this time, the pressure ratio becomes high and the flow rate becomes lower than expected. As a result, the locus of the actual operating point of the turbo compressor is as indicated by L12. As described above, when the rotation speed of the turbo compressor cannot follow the command of the control unit, the operating point may enter the surge region, thereby causing a surging problem.

Figure 3:
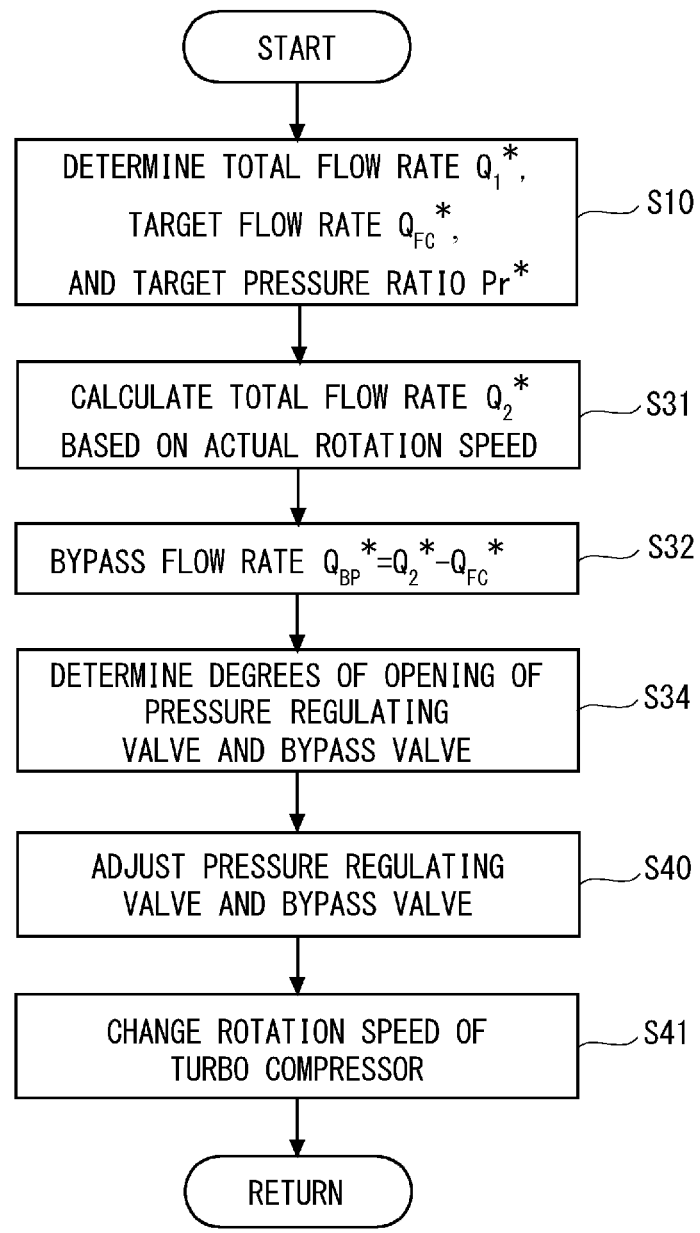
FIG. 3 is a flowchart showing the operation of the fuel cell system according to a first embodiment.

Next, a method by which the fuel cell system according to the first embodiment solves the aforementioned problem is described with reference to FIG. 3. FIG. 3 is a flowchart showing the operation of the fuel cell system according to the first embodiment.

In the fuel cell system according to the first embodiment, a target pressure ratio $Pr^*$, a flow rate $Q^*$ (referred to as a target flow rate $Q_{FC}^*$ of air in some cases) to the fuel cell, and a flow rate $Q_1^*$ (referred to as a total flow rate $Q_1^*$ and the like in some cases) of air supplied by the turbo compressor at the target operating point are determined in accordance with the flow rate of air required by the fuel cell (S10). Next, a flow rate $Q_2^*$ of air supplied based on the actual rotation speed of the turbo compressor (referred to as a total flow rate $Q_2^*$ based on the actual rotation speed in some cases) when assuming that the target pressure ratio has achieved $Pr^*$ while the actual rotation speed of the current turbo compressor is maintained is calculated (S31). In a phase in which the rotation speed of the turbo compressor is reduced, the relation of $Q_2^*>Q_1^*$ holds. From the $Q_2^*$ and the target flow rate $Q_{FC}^*$ of air to the fuel cell, a flow rate $Q_{BP}^*$ of excess air discharged from the bypass flow path is calculated (S32). Next, the degrees of opening of the pressure regulating valve and the bypass valve are respectively determined based on the target flow rate $Q_{FC}^*$ of air and the flow rate $Q_{BP}^*$ of excess air (S34). Note that the degrees of opening of the pressure regulating valve and the bypass valve are determined based on the pressure regulating valve and bypass valve operation map 50g (FIG. 1). The pressure regulating valve and bypass valve operation map 50g is experimentally determined in advance and stored in the ROM 50d.

Next, the pressure regulating valve and the bypass valve are adjusted based on the determined degrees of opening (S40), and the change of the rotation speed of the turbo compressor is started (S41). Note that the adjustment of the pressure regulating valve and the bypass valve and the change of the rotation speed of the turbo compressor may be started simultaneously.

The fuel cell system according to the first embodiment intermittently and repeatedly performs the processes of S10 to S41. At this time, the second and subsequent processes may be performed before the change of the rotation speed of the turbo compressor is completed. The value of the total flow rate $Q_2^*$ based on at least the actual rotation speed is corrected in the second and subsequent processes, since the rotation speed of the turbo compressor starts to be reduced. Note that the value of $Q_2^*$ approaches the target total flow rate $Q_1^*$. The degrees of opening of the pressure regulating valve and the bypass valve, and the rotation speed of the turbo compressor are corrected based on the corrected value of $Q_2^*$.

Figure 4:
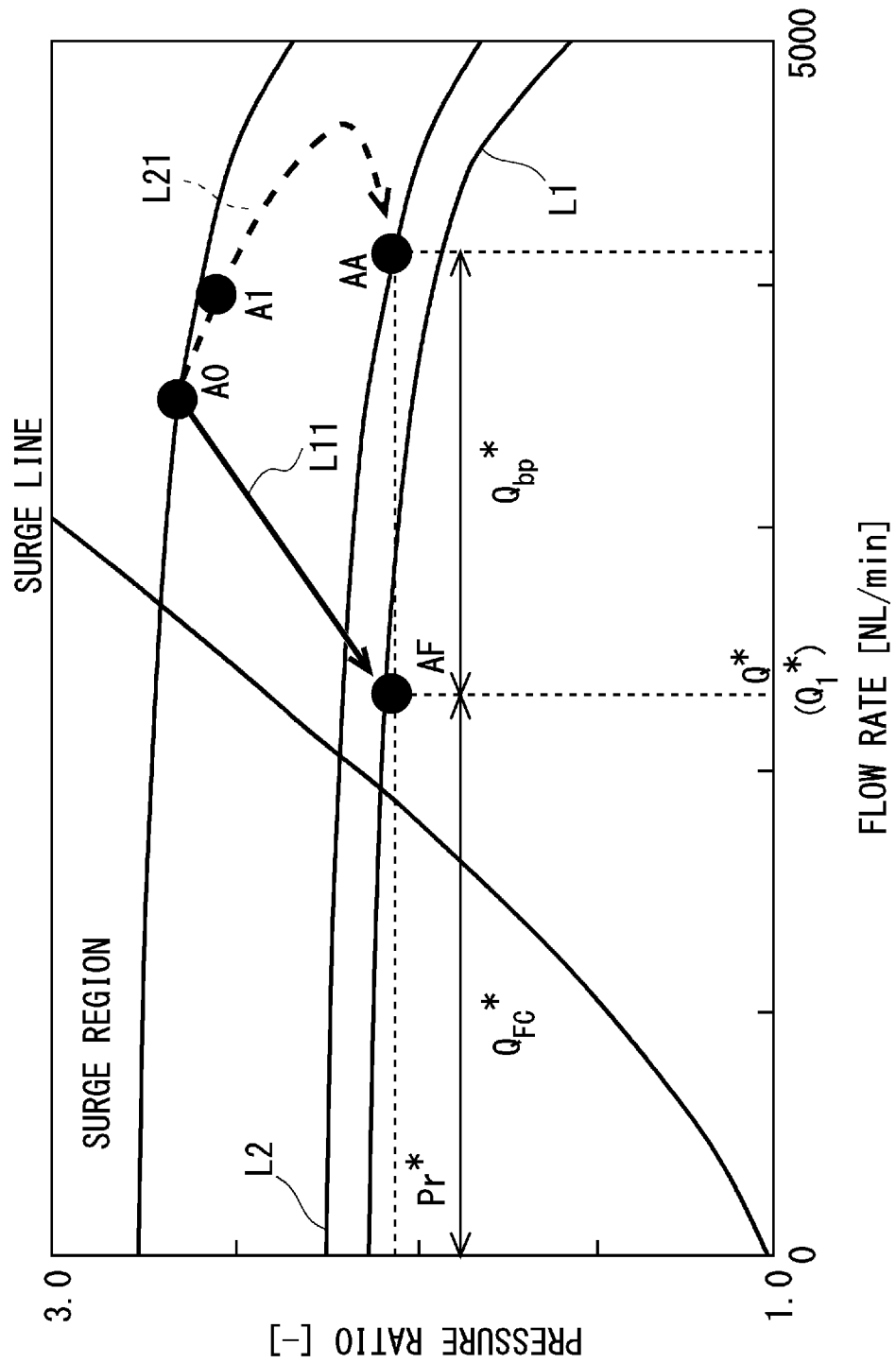
FIG. 4 is an explanatory diagram showing an example of a change in an operating point of a turbo compressor in the first embodiment.

FIG. 4 is an explanatory diagram showing an example of a change in the operating point of the turbo compressor in the first embodiment. A0 is the initial operating point of the turbo compressor, and AF is the target operating point. In the fuel cell system according to the first embodiment, the supply flow rate of the turbo compressor increases and the operating point moves in a direction away from the surge line (A0→A1) in order to calculate the degrees of opening of the pressure regulating valve and the bypass valve from the target pressure ratio $Pr^*$ and the total flow rate $Q_2^*$ based on the actual rotation speed. When the aforementioned processes of S10 to S41 are repeated at the operating point A1, the total flow rate $Q_2^*$ based on the actual rotation speed at the operating point A1 is calculated again. The movement of the operating point is corrected so as to approach the target operating point AF, since the flow rate $Q_2^*$ of supplied air at the operating point A1 is lower than that at the operating point A0. As a result, the locus of the actual operating point is as indicated by L21. In the first embodiment, the processes are completed when the pressure ratio reaches the target pressure ratio $Pr^*$. Therefore, in the example of FIG. 4, the operating point of the turbo compressor becomes stable at AA.

Figure 2:
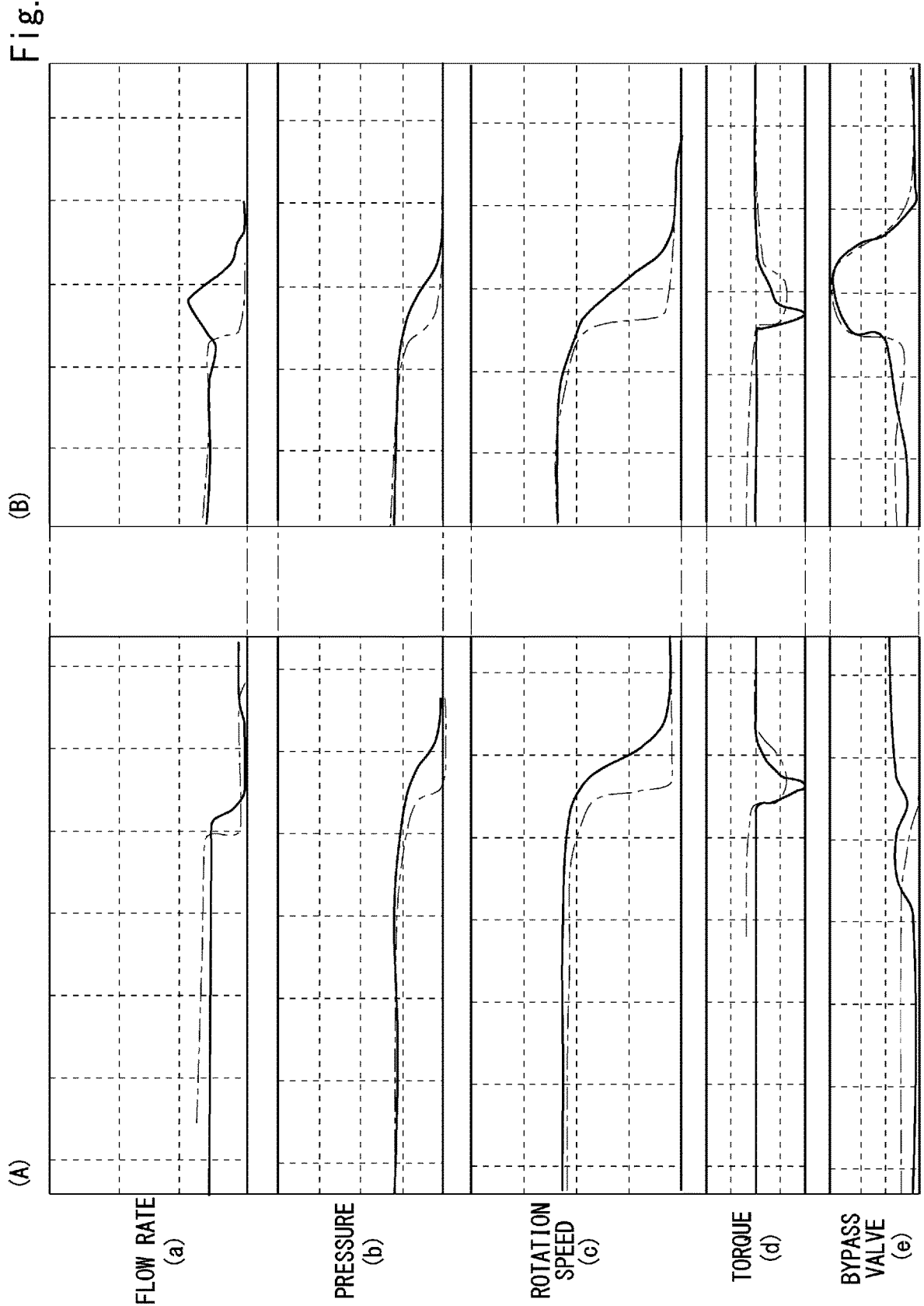
FIG. 2 is an explanatory diagram showing an example of an operation of the fuel cell system according to the embodiment and the related art.

FIG. 2 is an explanatory diagram showing an example of an operation of the fuel cell system according to this embodiment and the related art. FIG. 2(A) is a diagram showing the operation of the fuel cell system corresponding to FIG. 7, and FIG. 2(B) is a diagram showing an example of the operation of the fuel cell system according to the first embodiment. (a) indicates the flow rate of air supplied by the turbo compressor, (b) indicates the discharge pressure of the turbo compressor, (c) indicates the rotation speed of the turbo compressor, (d) indicates the torque, and (e) indicates the degree of opening of the bypass valve. Each solid line indicates an actual measured value. As shown in (c), the turbo compressor cannot follow the command for reducing the rotation speed thereof (the broken line), and the rotation speed has increased more than expected. In the fuel cell system according to this embodiment, the degree of opening of the bypass valve is increased assuming that a delay in following the command for reducing the rotation speed of the turbo compressor occurs ((e) shown in FIG. 2(B)). By doing so, the flow rate of air supplied by the turbo compressor is increased ((a) shown in FIG. 2(B)), thereby preventing surging of the turbo compressor.

As described above, by the fuel cell system according to the first embodiment, the operating point of the turbo compressor does not enter the surge region even if the flow rate of air supplied to the fuel cell is greatly changed, whereby the operation of the turbo compressor is prevented from being unstable.

Second Embodiment

In the fuel cell system according to the first embodiment, the final operating point is AA shown in FIG. 4, and the amount of air discharged from the bypass flow path is larger than that at the target operating point AF. The following second embodiment solves this problem. The fuel cell system according to the second embodiment is described below.

As shown in FIG. 1, the configuration of the fuel cell system according the second embodiment is the same as that of the fuel cell system according to the first embodiment.

Figure 5:
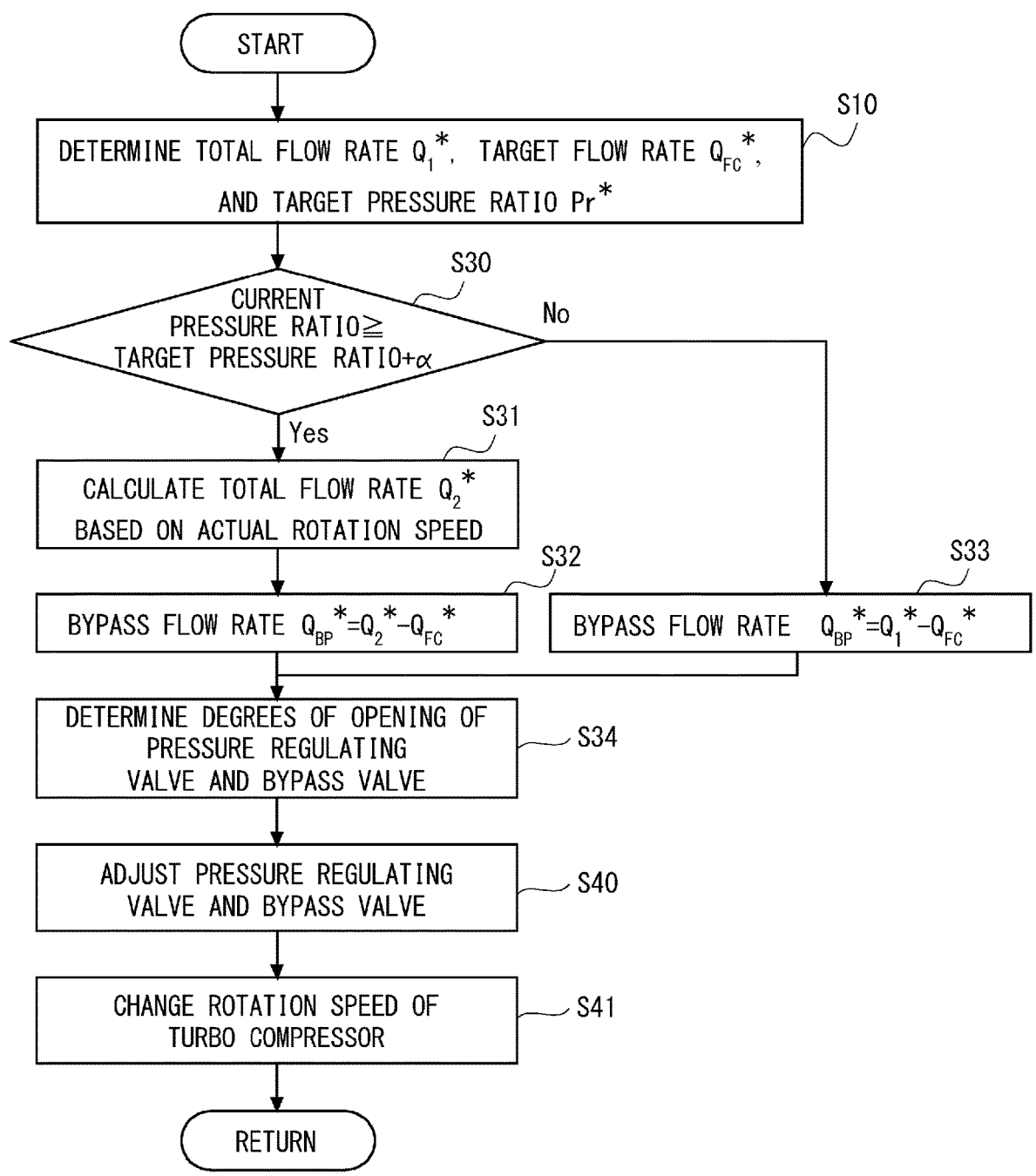
FIG. 5 is a flowchart showing the operation of the fuel cell system according to a second embodiment.

The fuel cell system according to the second embodiment is different from the first embodiment in regard to a control method. FIG. 5 is a flowchart showing the operation of the fuel cell system according to the second embodiment. In the fuel cell system according to the second embodiment, after the target pressure ratio Pr*, the flow rate Q*, and the flow rate $Q_1^*$ of air supplied by the turbo compressor at the target operating point are determined (S10), the current pressure ratio is compared with the target pressure ratio (S30). Then, if the current pressure ratio of the turbo compressor is a predetermined value α or more with respect to the target pressure ratio (Yes), the degrees of opening of the pressure regulating valve and the bypass valve are determined using the flow rate $Q_2^*$ of air supplied based on the actual rotation speed of the turbo compressor as in the case of the fuel cell system according the first embodiment (S31, S32, and S34). On the other hand, if the current pressure ratio of the turbo compressor is less than the predetermined value a with respect to the target pressure ratio (No), the degrees of opening of the pressure regulating valve and the bypass valve are determined using the target supply flow rate $Q_1^*$ (S33 and S34). Note that the predetermined value α is a value obtained experimentally.

If S30 is Yes, the operating point is likely to enter the surge region. Therefore, by performing a process similar to that of the fuel cell system according to the first embodiment, the operating point of the turbo compressor is prevented from entering the surge region.

On the other hand, if S30 is No, the possibility that the operating point enters the surge region is eliminated. Therefore, by determining the degrees of opening of the pressure regulating valve and the bypass valve based on the target supply flow rate $Q_1^*$, the amount of air discharged from the bypass valve can be reduced.

Figure 6:
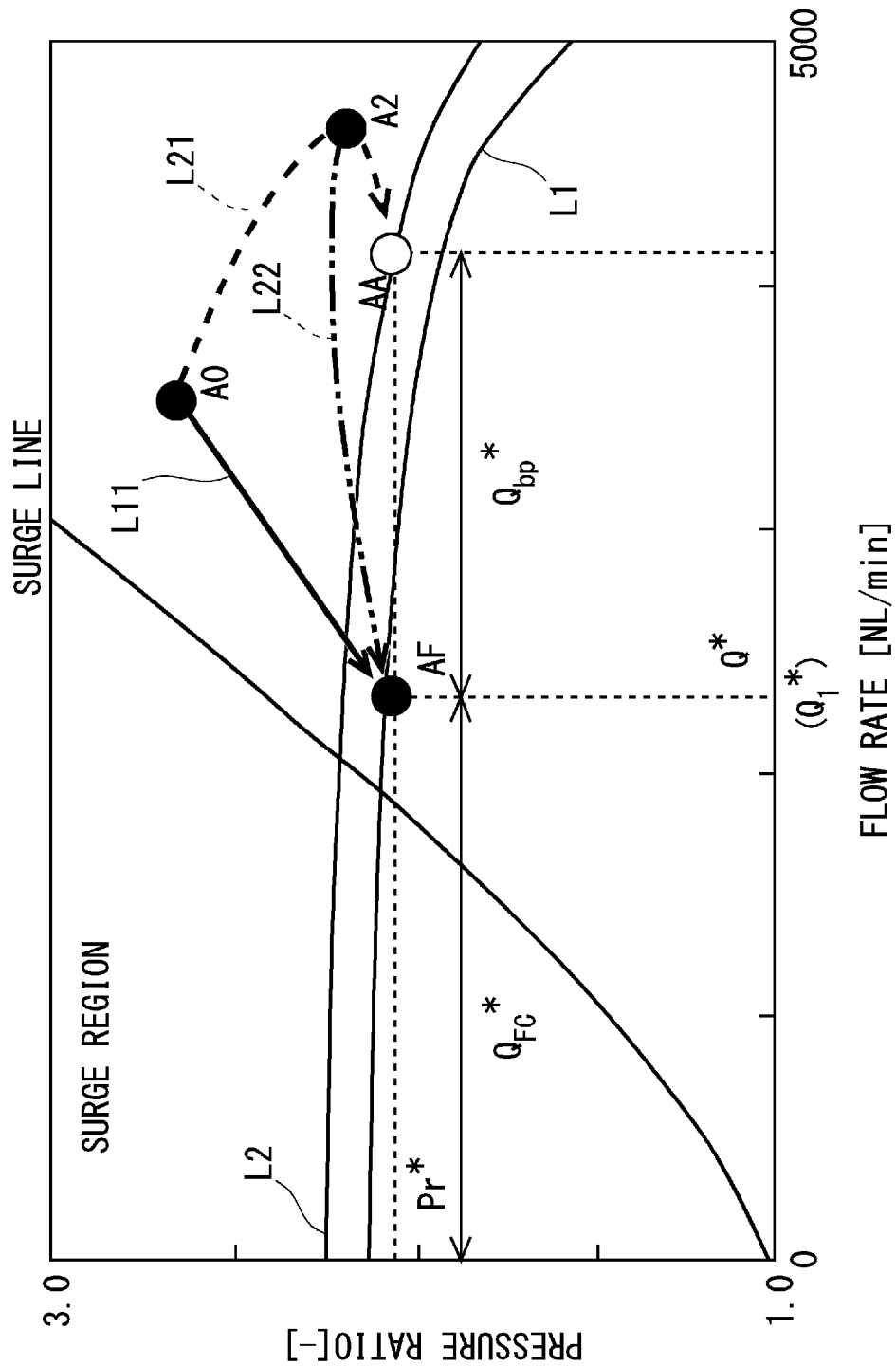
FIG. 6 is an explanatory diagram showing an example of a change in the operating point of the turbo compressor in the second embodiment.

FIG. 6 is an explanatory diagram showing an example of a change in the operating point of the turbo compressor in the second embodiment. In a range from the initial operating point A0 to the operating point A2, the determination in S30 is Yes. In this range, as in the case of the first embodiment, the locus of the operating point is as indicated by L21. If the current pressure ratio of the turbo compressor is less than the predetermined value α at the operating point A2 (the determination in S30 is No), the operating point is then moved based on the target flow rate $Q_1^*$, and consequently the locus of the operating point is as indicated by L22, and the operating point finally reaches the target operating point AF and the process is completed.

As described above, with the fuel cell system according to the second embodiment, the operating point of the turbo compressor does not enter the surge region even if the flow rate of air supplied to the fuel cell is greatly changed, and the operation of the turbo compressor is prevented from being unstable. Further, the amount of air discharged from the bypass flow path is reduced.

Modified Example

Figure 8:
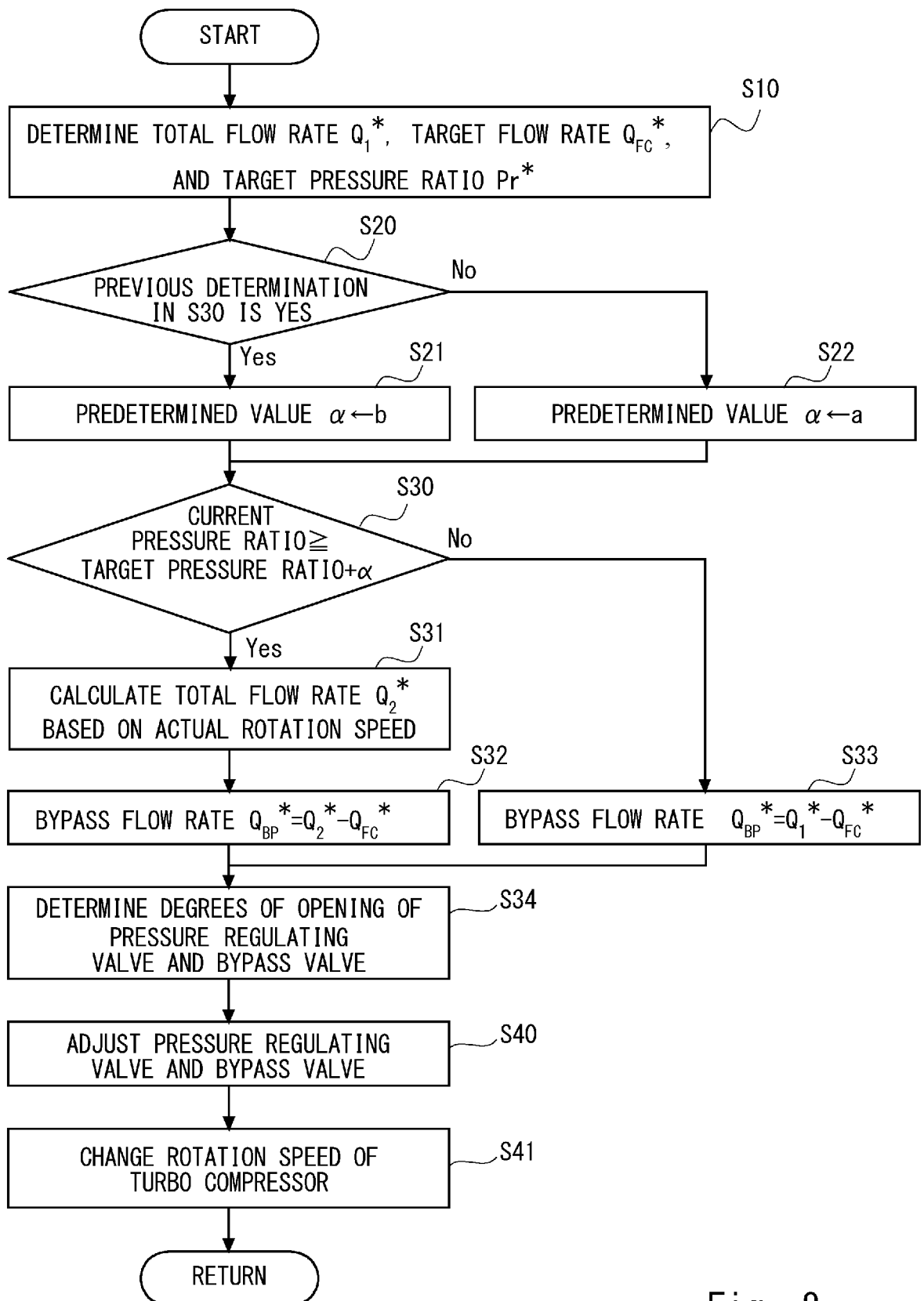
FIG. 8 is a flowchart showing an operation of a modified example of the fuel cell system according to the second embodiment.

FIG. 8 is a flowchart showing an operation of a modified example of the fuel cell system according to the second embodiment. The modified example is different from the second embodiment in that the determination in S20 is added. In this modified example, when the difference between the current pressure ratio and the target pressure ratio is around a predetermined value, the calculation criteria is prevented from frequently switching between $Q_1^*$ and $Q_2^*$. Specifically, two values a and b, for which a>b holds, are provided as the predetermined value a, and the interval between a and b is set as a latch interval. It is necessary to increase the current pressure ratio with respect to the target pressure ratio +a in order to change the calculation criteria from $Q_1^*$ to $Q_2^*$ by setting the predetermined value as described above. Further, it is necessary to reduce current pressure ratio with respect to the target pressure ratio +b in order to change the calculation criteria from $Q_2^*$ to $Q_1^*$. Thus, a frequent switching of the calculation criteria is prevented, whereby a frequent change of the degrees of opening of the pressure regulating valve and the bypass valve is prevented.

Further, as another modified example of the fuel cell system according to the second embodiment, the determination in S30 may be performed using the pressure deviation instead of the pressure ratio by setting the outside air pressure as a constant when the outside air pressure is stable. Furthermore, the determination in S30 may be performed using the flow rate deviation and the rotation speed deviation of the turbo compressor instead of the pressure ratio. In any of these cases, it is necessary to experimentally determine the value corresponding to the predetermined value α in advance.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A fuel cell system comprising:
a fuel cell;
an air supply flow path configured to supply air to the fuel cell;
a turbo compressor configured to supply air to the fuel cell through the air supply flow path;
a bypass flow path configured to discharge air by branching off from the air supply flow path so as to bypass the fuel cell;
a pressure regulating valve configured to adjust a flow rate of air passing through the air supply flow path;
a bypass valve configured to adjust a flow rate of air passing through the bypass flow path; and
a control unit configured to control the turbo compressor, the pressure regulating valve, and the bypass valve, wherein
the control unit:
determines a target pressure ratio Pr* and a target supply flow rate $Q_1^*$ based on a flow rate of air required by the fuel cell;
calculates, from a flow rate $Q_2^*$ of air supplied based on an actual rotation speed of the turbo compressor and a target flow rate $Q_{FC}^*$ of air to the fuel cell, a flow rate $Q_{BP}^*$ of excess air discharged from the bypass flow path when a current pressure ratio of the turbo compressor is equal to or higher than a predetermined value with respect to a target pressure ratio Pr*, and the predetermined value α being b;
calculates, from a target supply flow rate $Q_1^*$ of the turbo compressor and a target flow rate $Q_{FC}^*$ of air to the fuel cell, a flow rate $Q_{BP}^*$ of excess air discharged from the bypass flow path when a current pressure ratio of the turbo compressor is less than a predetermined value with respect to a target pressure ratio, and the predetermined value α being a, where a>b; and
determines degrees of opening of the pressure regulating valve and the bypass valve based on the target flow rate $Q_{FC}^*$ of air and the flow rate $Q_{BP}^*$ of excess air;

repeatedly performs the above processes before the change of the rotation speed of the turbo compressor is completed, and the above processes are completed when the pressure ratio reaches the target pressure ratio Pr*.

* * * * *